US 6,589,090 B2

(12) United States Patent
Murtishaw et al.

(10) Patent No.: US 6,589,090 B2
(45) Date of Patent: Jul. 8, 2003

(54) METHOD OF SALVAGING COMPONENTS OF A CATHODE RAY TUBE WHEN EXTRACTING FAILED COMPONENTS FOR TESTING

(75) Inventors: David Allen Murtishaw, Sun City, CA (US); Edward Martinez, Vista, CA (US); Brian Michael Solomich, Vista, CA (US)

(73) Assignees: Sony Corporation, Tokyo (JP); Sony Electronics, Inc., Park Ridge, NJ (US)

( * ) Notice: Subject to any disclaimer, the term of this patent is extended or adjusted under 35 U.S.C. 154(b) by 70 days.

(21) Appl. No.: 09/825,530

(22) Filed: Apr. 3, 2001

(65) Prior Publication Data

US 2002/0142695 A1 Oct. 3, 2002

(51) Int. Cl.[7] .................................................. H01J 9/50
(52) U.S. Cl. .............................................. 445/2; 445/61
(58) Field of Search ................. 445/61, 62, 2

(56) References Cited

U.S. PATENT DOCUMENTS

| 3,594,059 A | * | 7/1971 | Holtz ........................... 445/61 |
| 3,607,174 A | * | 9/1971 | Patrick ........................... 445/2 |
| 3,979,633 A | * | 9/1976 | Davis et al. ................. 313/481 |
| 4,457,731 A | * | 7/1984 | Patrickson et al. ............. 445/2 |

* cited by examiner

Primary Examiner—P. Austin Bradley
Assistant Examiner—Briggitte R. Hammond
(74) Attorney, Agent, or Firm—Steven L. Nichols; Rader, Fishman & Grauer PLLC (57) ABSTRACT

When an installed electron gun has failed testing, the gun is cut out of the neck of the Cathode Ray Tube ("CRT") without destroying or damaging any other portion of the CRT. A new neck is then formed on the tube which can be re-inserted into the production line and re-used. The reclaimed electron gun can then be analyzed and tested to determine the cause of its malfunction or test failure. In this way, minimal damage is done to the CRT in which the gun is originally installed and as much of that CRT as possible is salvaged for use in a completed unit.

19 Claims, 5 Drawing Sheets

METHOD OF SALVAGING COMPONENTS OF A CATHODE RAY TUBE WHEN EXTRACTING FAILED COMPONENTS FOR TESTING

FIELD OF THE INVENTION

The present invention relates to the field of cathode ray tube manufacture. More particularly, the present invention relates to the field of salvaging components of a cathode ray tube that has failed preliminary testing and must have a component or components, particularly the electron gun, removed for analysis or replacement. The present invention provides a method of salvaging the remainder of the cathode ray tube, replacing the neck of the tube and reusing the reworked tube in completing the manufacture of a working unit.

BACKGROUND OF THE INVENTION

Figure 1:
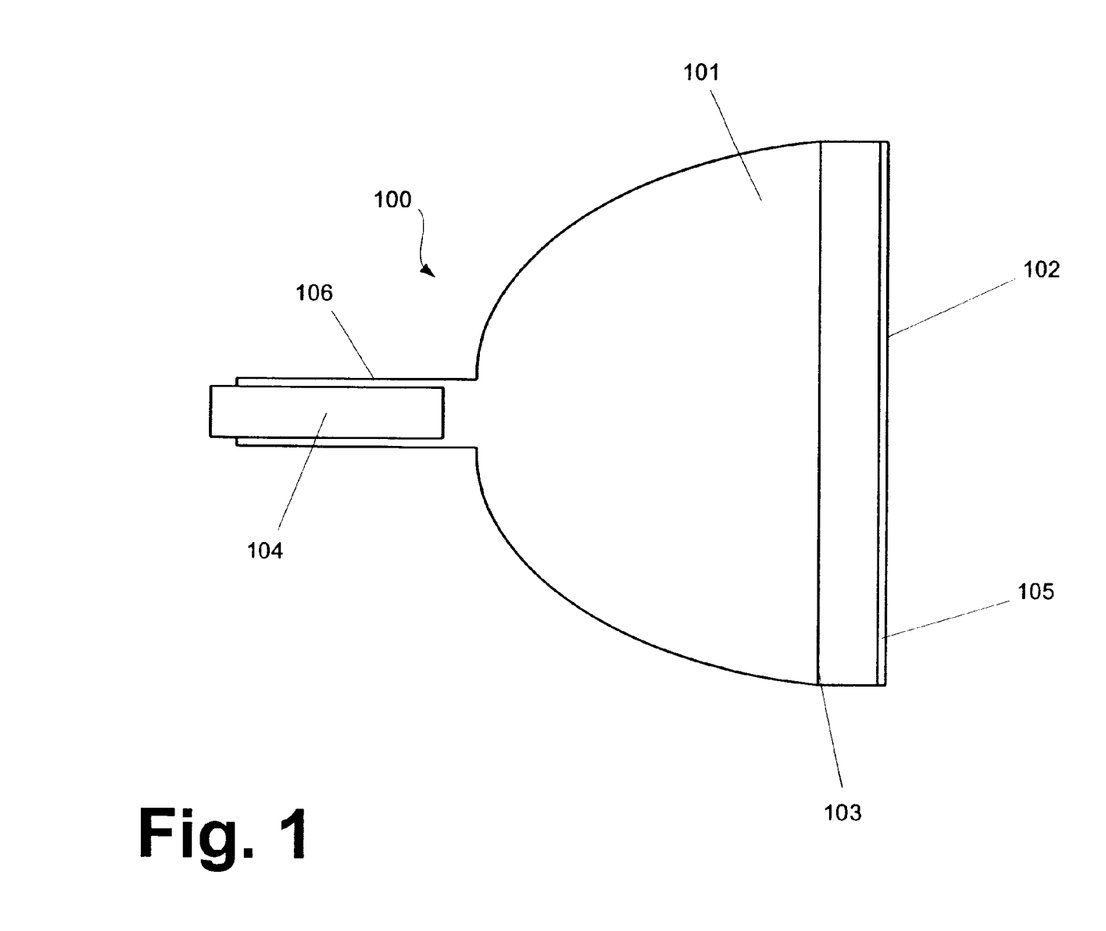
FIG. 1 is an illustration of a cathode ray tube on which the present invention can be practiced.

Cathode ray tubes ("CRTs") are used in most television sets and computer and video monitors. A cathode ray tube, on which the present invention can be practiced, is illustrated in FIG. 1. The CRT (100) is a glass tube with a bottle-like shape in which a relatively wide bell-like portion (101) narrows into an elongated neck portion (106).

At the wide end of the bell-like portion (101) is a relatively flat portion (102) of the CRT (100). This flat portion (102) becomes the screen on which the display of the television set or monitor is generated when the CRT is incorporated therein.

The flat or display portion (102) is typically sealed to the bell-like portion (101) using molten glass called frit (103). When the frit (103) cools and hardens, it seals the display surface (102) to the rest of the tube (100).

A layer of phosphor (105), a material that emits light when struck by an electron beam, is coated over the display portion (102) of the CRT. An electron gun (104) is then installed in the neck (106) of the CRT (100). A stream of electrons emitted from the electron gun (106) is scanned over the phosphor (105) and turned on and off during the scanning to cause the phosphor (105) to glow in certain places and not others. In very simple terms, this is how an image is generated on the screen (102) of a television or video monitor.

A electromagnetic yoke (not shown) is provided around the neck (106) of the CRT (100). This yoke produces a controlled magnetic field through which the electron beam from the electron gun (106) passes. The electron beam is deflected from a straight line by the magnetic field of the yoke. The degree and direction of the deflection depend upon the magnetic field generated by the yoke. Consequently, by varying the magnetic field created by the yoke in a precise cycle, the electron beam can be scanned, line-by-line, over the entire surface of the screen (102) to generate video images thereon.

When manufacturing a CRT, the installation of the electron gun (104) is a very important part of the process. Without an appropriately mounted and functioning electron gun (104), the CRT (100) will be useless. Consequently, the installation of the electron gun (104) is typically done with appropriate care. Additionally, it is important to prevent any dust or other contaminants from entering the tube (100) prior to installation of the electron gun (104). Once installed, the gun (104) is permanently sealed into the neck (106) of the tube (100).

After the gun (104) has been installed, it is tested to ensure that it will operate properly when the CRT (100) is completed and incorporated into a television set or video monitor. Unfortunately, it is not uncommon for the electron gun (104) to fail this testing.

Because the electron gun (104) is permanently sealed into the neck of the cathode ray tube (101), it has been the exclusive practice in the industry to destroy the tube (101) when an electron gun (104) has failed testing. The gun (104) may then be salvaged and tested to determine the cause of its failure. However, the CRT (101) is lost at considerable expense to the manufacturing process. It is estimated that the value of each such CRT (101) destroyed is $300 to $500.

Consequently, there is a need in the art for a means and method of salvaging more of the cathode ray tube when the electron gun has failed testing and must be removed for analysis and replacement.

SUMMARY OF THE INVENTION

The present invention meets the above-described needs and others. Specifically, the present invention provides a means and method of salvaging more of the cathode ray tube when the electron gun has failed testing and must be removed for analysis and replacement.

Additional advantages and novel features of the invention will be set forth in the description which follows or may be learned by those skilled in the art through reading these materials or practicing the invention. The advantages of the invention may be achieved through the means recited in the attached claims.

The present invention may be embodied and described as an improved and cost-efficient method of manufacturing cathode ray tubes, where an electron gun has been installed in a neck portion of a cathode ray tube and has failed testing. The method of the present invention includes removing the electron tube out of the neck portion of the cathode ray tube without damaging any portion of the cathode ray tube other than the neck portion; and forming a new neck portion on the cathode ray tube.

A second electron gun may then be installed in the newly-formed neck portion of the cathode ray tube. Preferably, the method also includes further testing of this second electron gun for operation within predefined parameters. The method may also preferably include testing the electron gun removed from the cathode ray tube to determine cause or extent of failure.

Removing the electron gun may be performed by cutting the electron gun out of the neck portion of the cathode ray tube. Alternatively, removing the electron gun may be performed by fracturing the neck portion of the cathode ray tube.

The method of the present invention may also include the initial testing of electron gun to determine a failure prior to removal of the electron gun. This testing preferably is performed by providing a signal to the electron gun to cause the electron gun to emit an electron beam; and monitoring output of the electron gun to determine operability of the electron gun according to predefined parameters.

The present invention also encompasses the necessary collection of devices and apparatuses required to perform the method described above. Specifically, the present invention encompasses a system of manufacturing cathode ray tubes, where an electron gun has been installed in a neck portion of a cathode ray tube and has failed testing. This system preferably includes means for removing the electron tube out of the neck portion of the cathode ray tube without damaging any portion of the cathode ray tube other than the neck portion; and means for forming a new neck portion on the cathode ray tube.

BRIEF DESCRIPTION OF THE DRAWINGS

The accompanying drawings illustrate preferred embodiments of the present invention and are a part of the specification. Together with the following description, the drawings demonstrate and explain the principles of the present invention.

Throughout the drawings, identical elements are designated by identical reference numbers.

DETAILED DESCRIPTION OF THE PREFERRED EMBODIMENTS

Stated in broad general principles, the present invention provides a method and means by which, when an installed electron gun has failed testing, the gun is cut out of the neck of the Cathode Ray Tube ("CRT") without destroying or damaging any other portion of the CRT. A new neck is then formed on the tube which can be re-inserted into the production line and re-used. The reclaimed electron gun can then be analyzed and tested to determine the cause of its malfunction or test failure. In this way, minimal damage is done to the CRT in which the gun is originally installed and as much of that CRT as possible is salvaged for use in a completed unit.

Using the drawings, the preferred embodiments of the present invention will now be explained. As noted above, FIG. 1 illustrates the principle elements of a CRT with which the present invention is concerned and on which the present invention is practiced. As shown in FIG. 1, the CRT (100) is a glass tube with a bottle-like shape in which a relatively wide bell-like portion (101) narrows into an elongated neck portion (106). At the wide end of the bell-like portion (101) is a relatively flat portion (102) of the CRT (100). This flat portion (102) becomes the screen on which the display of the television set or monitor is generated when the CRT is incorporated therein.

A layer of phosphor (105), a material that emits light when struck by an electron beam, is coated over the display portion (102) of the CRT. An electron gun (104) is then installed in the neck (106) of the CRT (100). A stream of electrons emitted from the electron gun (106) is scanned over the phosphor (105) and turned on and off during the scanning to cause the phosphor (105) to glow in certain places and not others. In very simple terms, this is how an image is generated on the screen (102) of a television or video monitor.

When manufacturing a CRT, the installation of the electron gun (104) is a very important part of the process. Without an appropriately mounted and functioning electron gun (104), the CRT (100) will be useless. Consequently, the installation of the electron gun (104) is typically done with appropriate care. Additionally, it is important to prevent any dust or other contaminants from entering the tube (100) prior to installation of the electron gun (104). Once installed, the gun (104) is permanently sealed into the neck (106) of the tube (100).

Figure 2:
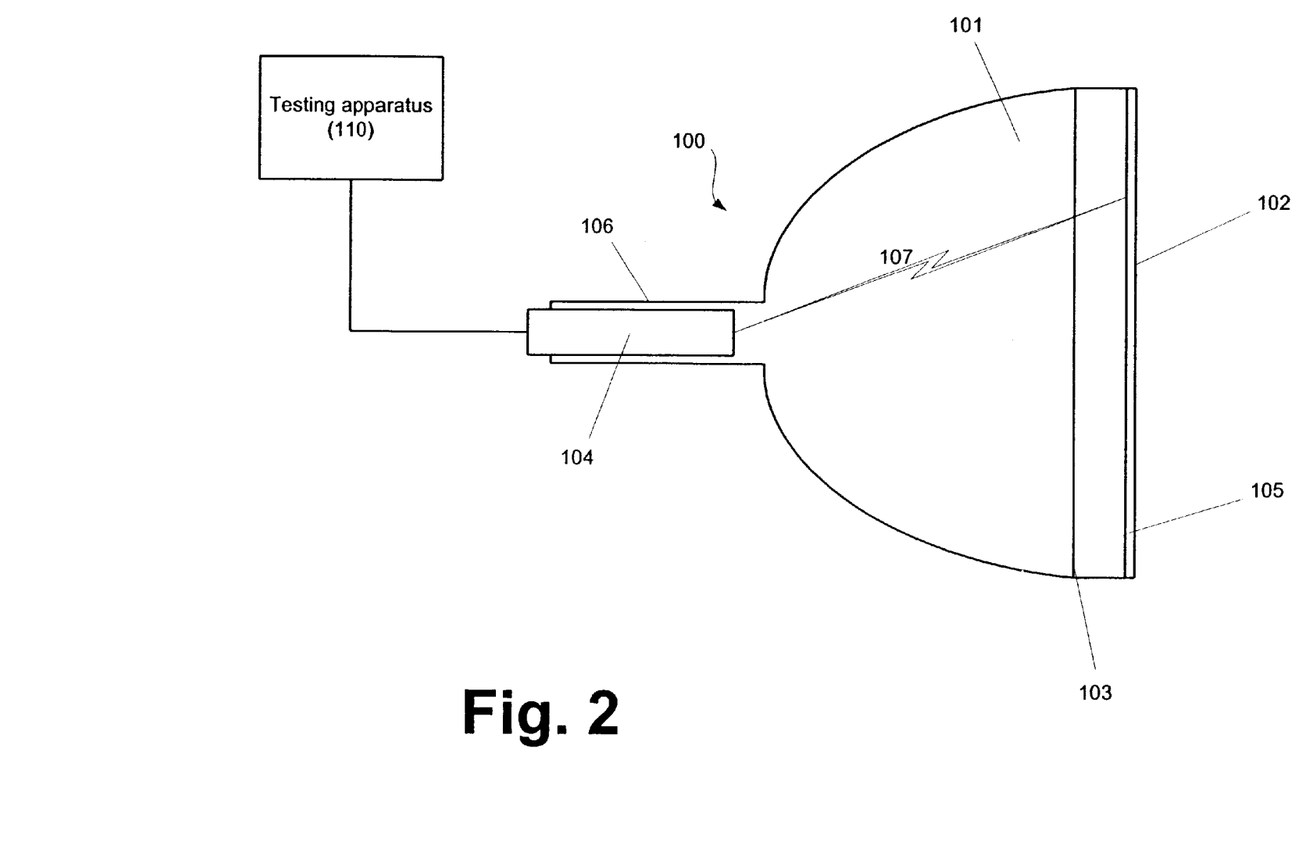
FIG. 2 is an illustration of means and method of testing the electron gun in a cathode ray tube under the principles of the present invention.

As shown in FIG. 2, after the gun (104) has been installed, it is tested to ensure that it will operate properly when the CRT (100) is completed and incorporated into a television set or video monitor. Consequently, the electron gun (104) is connected to a testing apparatus (110) that will feed signals to the gun (104) and monitor the gun's response. The testing apparatus (110) may include sensors located adjacent the screen portion (102) of the CRT (100), sensors receiving response signals output by the electron gun (104) and other sensors.

In response to an input video or test signal, the gun (104) emits an electron beam (107), as described above, to cause the phosphor layer (105) to emit light where the electron beam (107) strikes. The testing apparatus (110) will determine if the gun (104) is functioning properly, i.e., emitting an electron beam (107) of appropriate intensity and timing in response to the input video or test signal. Unfortunately, it is not uncommon for the electron gun (104) to fail this testing.

Because the electron gun (104) is permanently sealed into the neck (106) of the cathode ray tube (101), it has been the exclusive practice in the industry to destroy the tube (101) when an electron gun (104) has failed testing. The gun (104) may then be salvaged and tested to determine the cause of its failure. However, the CRT (101) is lost at considerable expense to the manufacturing process. It is estimated that the value of each such CRT (101) destroyed is $300 to $500.

Figure 3:
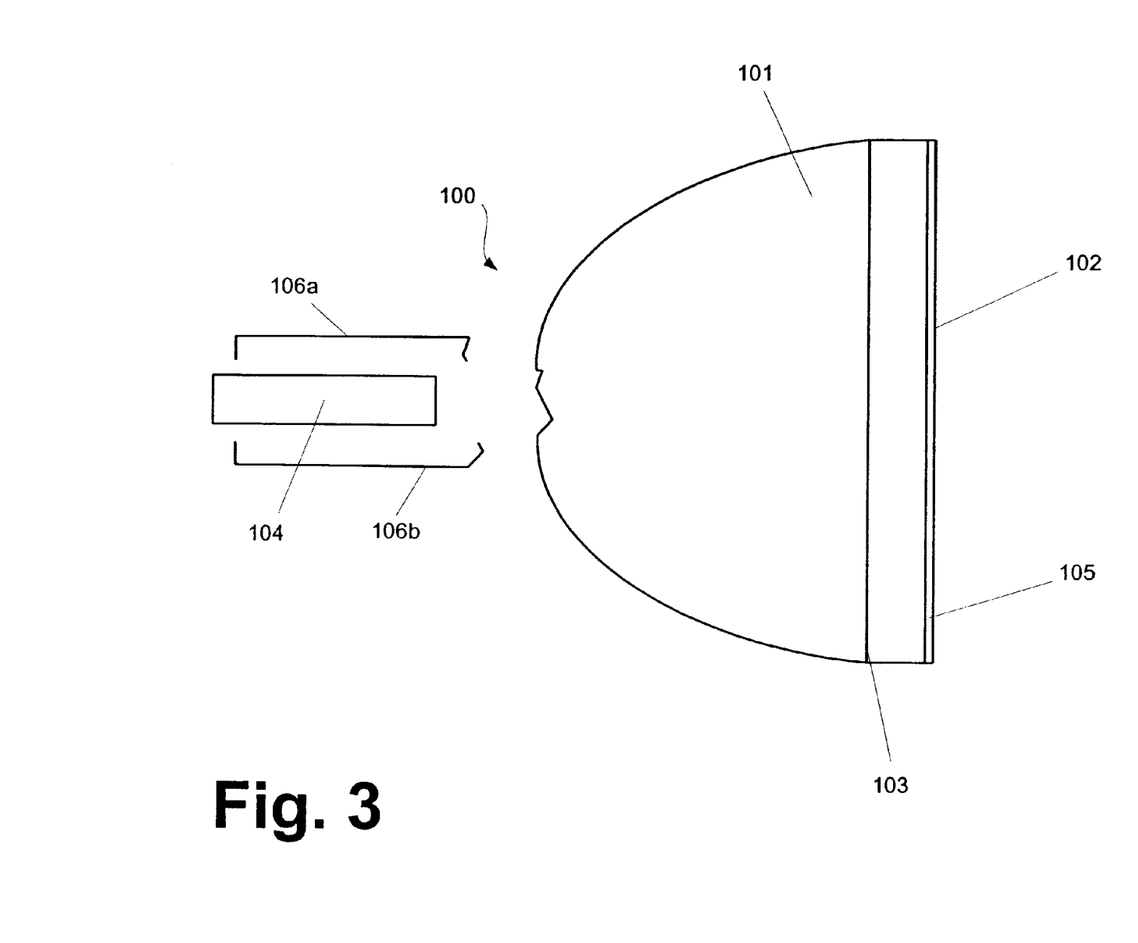
FIG. 3 is an illustration of the partial destruction of a cathode ray tube under the principles of the present invention to extract an electron gun that has failed testing after being installed.

Instead, under the principles of the present invention, the neck (106) is removed from the main portion (101) of the CRT (100) as shown in FIG. 3. The neck (106) is then fractured or cut into two or more pieces (106a, 106b) to free the electron gun (104). The electron gun (104) is then available for testing and analysis to determine the cause and extent of its failure or malfunction. The apparatus used to test the removed electron gun (104) may be the same testing apparatus (110) shown in FIG. 2 or may include additional diagnostic equipment and disassembly techniques. Such means for testing the electron gun are generally known to the art.

The means for deconstructing the neck (106) can be any of the known means for breaking or cutting glass. This may include saws, blades, torches, vices, presses, hammers and the like. Different means of breaking or cutting the electron gun (104) out of the neck (106) may differ in their tendency to unnecessarily damage the electron gun (104) or other portions of the CRT (100). Consequently, in certain applications, particular means of removing the electron gun (104) from the neck (106) may be preferred and superior.

Figure 4:
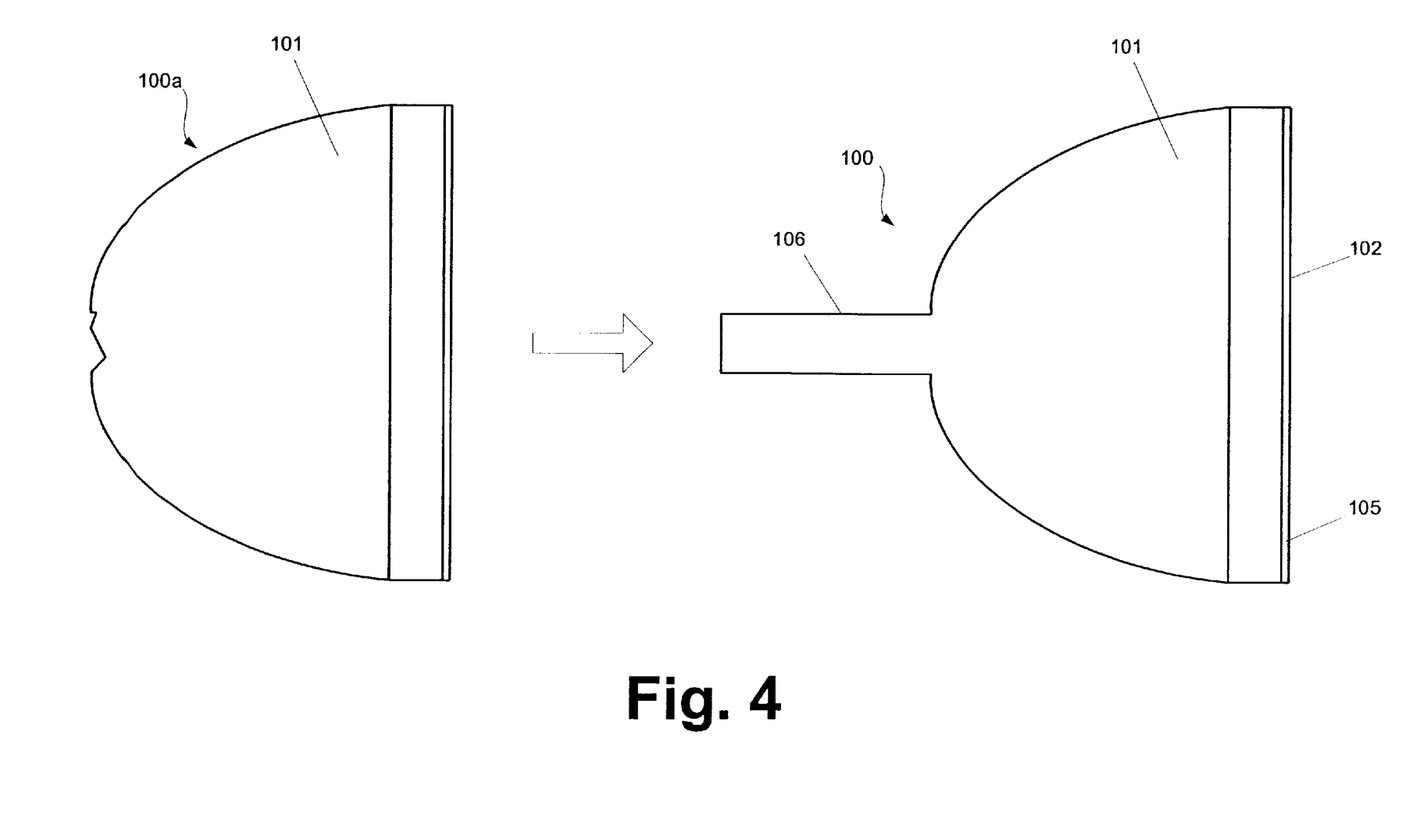
FIG. 4 is an illustration of the partial reconstruction of the cathode ray tube, according to the present invention, following the partial destruction illustrated in FIG. 3.

As shown in FIG. 4, the neck-less CRT (100a) is then salvaged. A new neck (106) is formed on the CRT (100a). This replacing or re-working of the neck portion (106) is a procedure known to the art and will be not be described in great detail herein. Rather, a new neck portion (106) is formed on the neck-less CRT (100a). The resulting, whole tube (100) can be re-introduced into the production line and re-used. A new electron gun is installed in the re-formed neck (106) and the testing process is again performed.

As indicated above, this process salvages much of the CRT, i.e., CRT (100a), which can be re-used in the manufacturing process. The expected cost savings is $300 to $500 per salvaged CRT.

Figure 5:
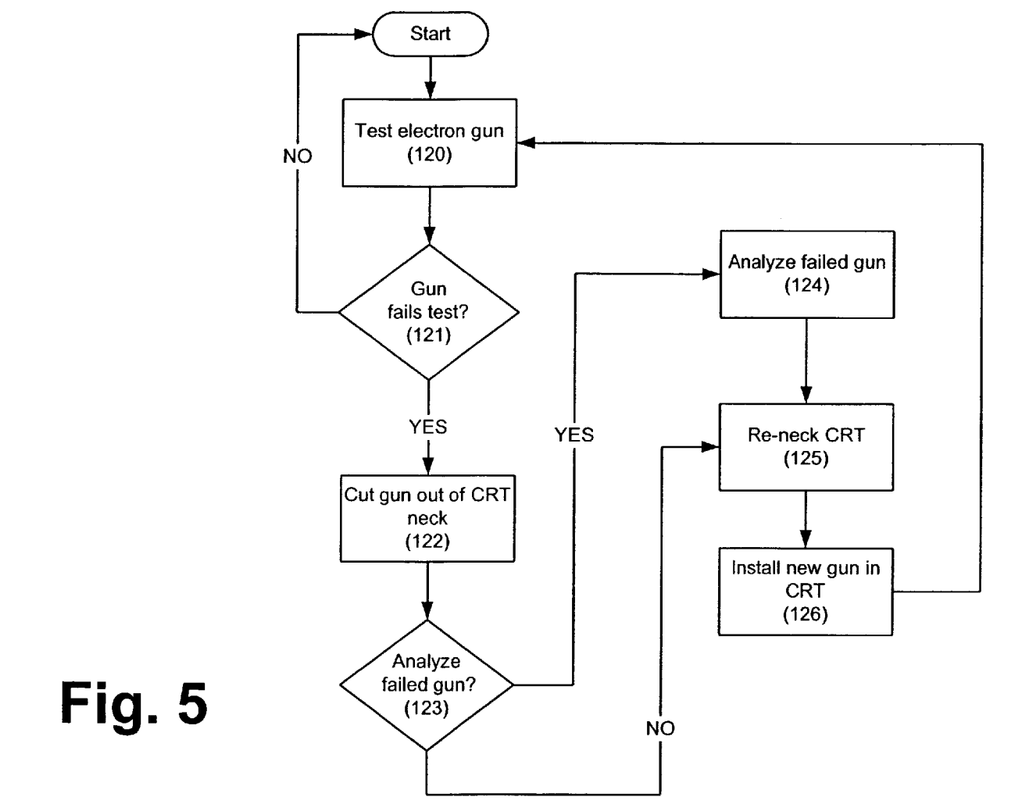
FIG. 5 is a flowchart illustrating the method of extracting a failed electron gun and salvaging substantial portions of the cathode ray tube according to the principles of the present invention.

FIG. 5 is a flowchart illustrating the method of the present invention. As shown in FIG. 5, the method starts after an electron gun has been installed in a cathode ray tube. The electron gun is then tested (120) (using, for example, the apparatus illustrated in FIG. 2). If the gun passes the test (121), the CRT is moved further along the production line. If, however, the gun fails the test (121), the gun is cut out of the neck of the CRT (122).

Once the gun has been removed from the CRT, the manufacturer may or may not desire to subject the gun to further testing to determine the cause and/or extent of its failure (123). If the manufacturer desires to have the gun tested, the gun is further tested and analyzed to pinpoint the defects (124). This procedure may include disassembly or destruction of all or portions of the electron gun.

Whether or not the gun is further tested, the remainder of the CRT can be salvaged to reduce the manufacturing costs of the production line. As illustrated in FIG. 4, the CRT is re-necked, or, in other words, a new neck portion is formed on the CRT to replace the neck that was cut apart to remove the defective electron gun. In FIG. 5, the CRT is re-necked (125).

After the CRT has been repaired, i.e., a new neck portion has been formed, the CRT is re-introduced into the production line. A new electron gun is installed in the re-worked neck of the CRT (126). This gun is again, preferably, subject to testing (120) and the procedure is repeated. If the gun passes the test, the CRT will be advanced along the production line. If the gun fails, it may be cut from the CRT neck and tested as described above.

Failures of installed electron guns are infrequent enough that two subsequent failures in a single CRT are unlikely. However, if such were to occur, the manufacturer may establish a policy as to the maximum number of times a neck will be reformed on a CRT for salvage purposes.

The preceding description has been presented only to illustrate and describe the invention. It is not intended to be exhaustive or to limit the invention to any precise form disclosed. Many modifications and variations are possible in light of the above teaching.

The preferred embodiment was chosen and described in order to best explain the principles of the invention and its practical application. The preceding description is intended to enable others skilled in the art to best utilize the invention in various embodiments and with various modifications as are suited to the particular use contemplated. It is intended that the scope of the invention be defined by the following claims.

What is claimed is:

1. A method of manufacturing cathode ray tubes, wherein an electron gun has been installed in a neck portion of a cathode ray tube and has failed testing, said method comprising:
   removing said electron gun out of said neck portion of said cathode ray tube while avoiding damage to any portion of said cathode ray tube other than said neck portion; and
   testing said electron gun to determine said failure prior to said step of removing said electron gun.

2. The method of claim 1, further comprising testing said electron gun removed from said cathode ray tube to determine cause or extent of failure.

3. The method of claim 1, wherein said removing said electron gun comprises cutting said electron gun out of said neck portion of said cathode ray tube.

4. The method of claim 1, wherein said removing said electron gun comprises fracturing said neck portion of said cathode ray tube.

5. The method of claim 1, wherein said testing comprises:
   providing a signal to said electron gun to cause said electron gun to emit an electron beam; and
   monitoring output of said electron gun to determine operability of said electron gun according to predefined parameters.

6. The method of claim 1, further comprising forming a new neck portion on said cathode ray tube.

7. The method of claim 3, further comprising installing a second electron gun in said newly-formed neck portion of said cathode ray tube.

8. The method of claim 7, further comprising testing said second electron gun for operation within predefined parameters.

9. A system of manufacturing cathode ray tubes, wherein an electron gun has been installed in a neck portion of a cathode ray tube and has failed testing, said system comprising
   means for removing said electron gun out of said neck portion of said cathode ray tube while avoiding damage to any portion of said cathode ray tube other than said neck portion;
   means for forming a new neck portion on said cathode ray tube; and
   means for testing said electron gun to determine said failure prior to removing said electron gun.

10. The system of claim 9, further comprising means for testing said electron gun removed from said cathode ray tube to determine cause or extent of failure.

11. The system of claim 9, wherein said means for removing said electron gun comprises means for cutting said electron gun out of said neck portion of said cathode ray tube.

12. The system of claim 9, wherein said means for removing said electron gun comprises means for fracturing said neck portion of said cathode ray tube.

13. The system of claim 9, wherein said means for testing comprises:
   means for providing a signal to said electron gun to cause said electron gun to emit an electron beam; and
   means for monitoring output of said electron gun to determine operability of said electron gun according to predefined parameters.

14. The system of claim 9, further comprising means for installing a second electron gun in said newly-formed neck portion of said cathode ray tube.

15. The system of claim 14, further comprising means for testing said second electron gun for operation within predefined parameters.

16. A method of manufacturing cathode ray tubes, wherein each cathode ray tube comprises an electron gun installed in a neck portion of that cathode ray tube, when said electron gun is defective, said method comprising:
   removing said electron gun from said neck portion of said cathode ray tube without damaging any portion of said cathode ray tube other than said neck portion; and
   testing said electron gun to determine said failure prior to said step of removing said electron gun.

17. The method of claim 16, wherein said testing comprises:

providing a signal to said electron gun to cause said electron gun to emit an electron beam; and monitoring output of said electron gun to determine operability of said electron gun according to predefined parameters.

18. A system of manufacturing cathode ray tubes, wherein each cathode ray tube comprises a defective electron gun installed in a neck portion of that cathode ray tube, said system comprising:

means for removing said electron gun out of said neck portion of said cathode ray tube without damaging any portion of said cathode ray tube other than said neck portion;

means for forming a new neck portion on said cathode ray tube; and means for testing said electron gun to determine that said electron gun is defective prior to removing said electron gun.

19. The system of claim 18, wherein said means for testing comprises:

means for providing a signal to said electron gun to cause said electron gun to emit an electron beam; and means for monitoring output of said electron gun to determine operability of said electron gun according to predefined parameters.

* * * * *

UNITED STATES PATENT AND TRADEMARK OFFICE
CERTIFICATE OF CORRECTION

PATENT NO.   : 6,589,090 B2
DATED        : July 8, 2003
INVENTOR(S)  : David Allen Murtishaw, Edward Martinez and Brian Michael Solomich It is certified that error appears in the above-identified patent and that said Letters Patent is hereby corrected as shown below:

<u>Column 6,</u>
Line 15, change "The method of claim 3" to -- The method of claim 6 --.

Signed and Sealed this

Seventh Day of October, 2003

JAMES E. ROGAN
*Director of the United States Patent and Trademark Office*